May 6, 1958  E. H. LAND  2,833,192
SELF-PROCESSING FILM ASSEMBLAGE
Filed Oct. 3, 1955  2 Sheets-Sheet 1
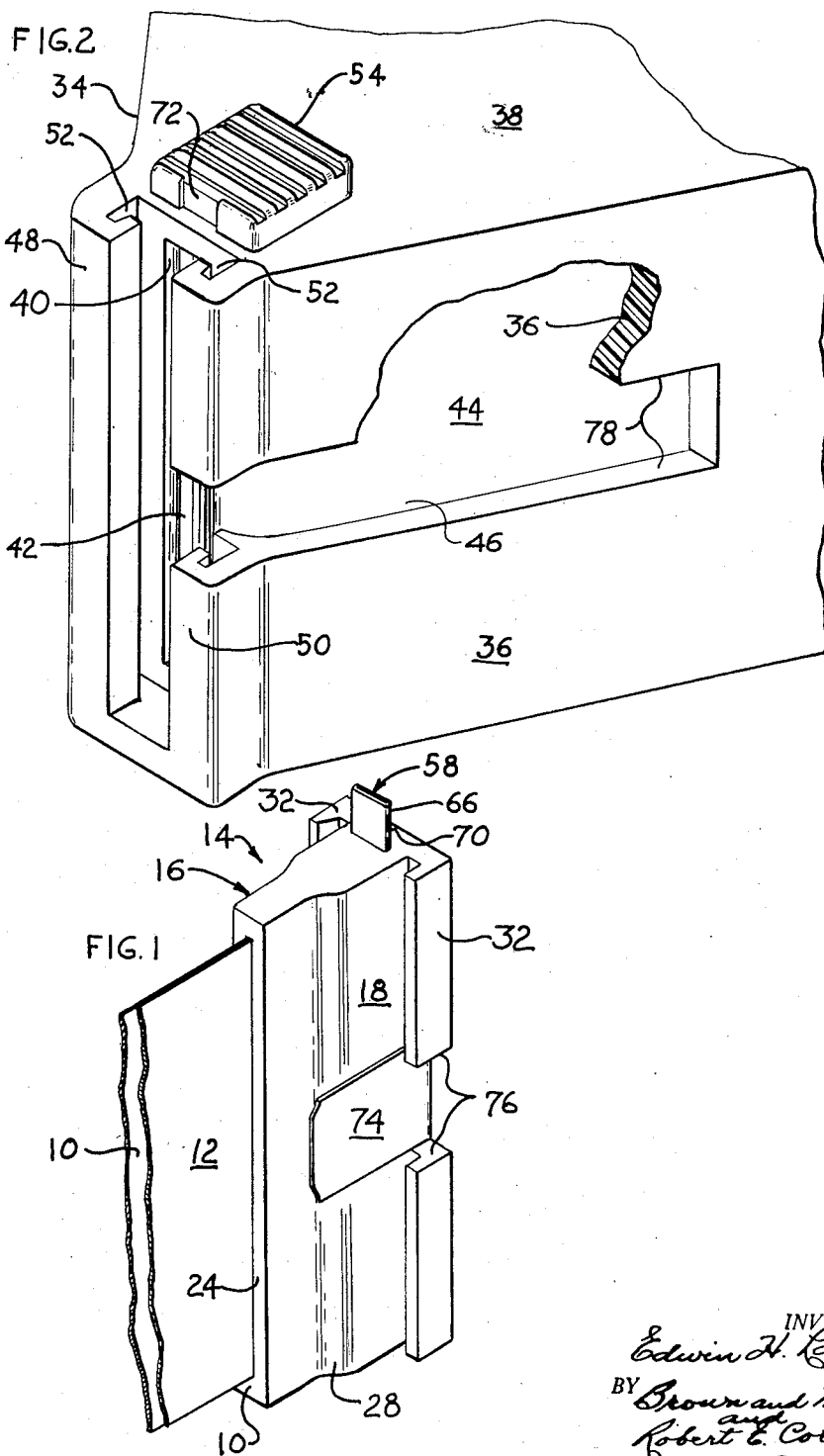
INVENTOR.
Edwin H. Land
BY Brown and Mikulka
and
Robert E. Corb
Attorneys May 6, 1958  E. H. LAND  2,833,192
SELF-PROCESSING FILM ASSEMBLAGE
Filed Oct. 3, 1955  2 Sheets-Sheet 2
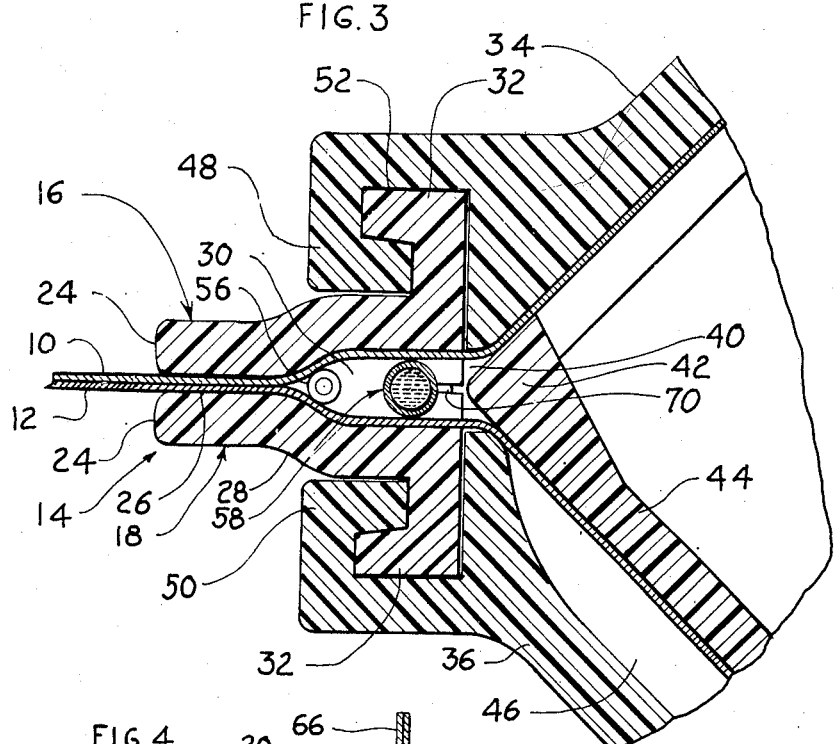
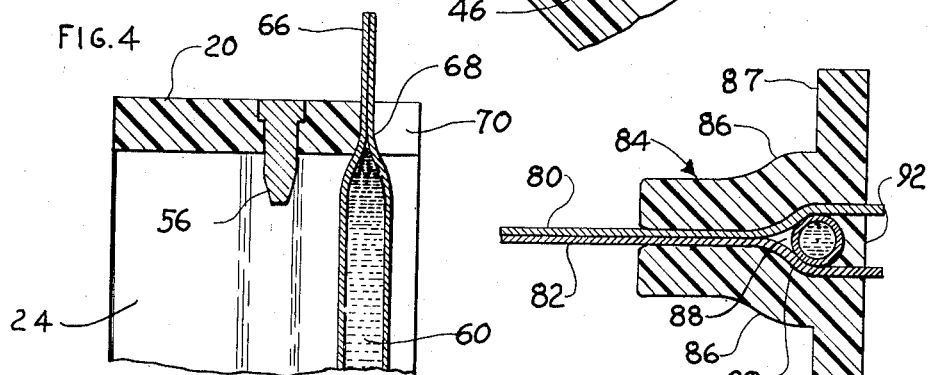
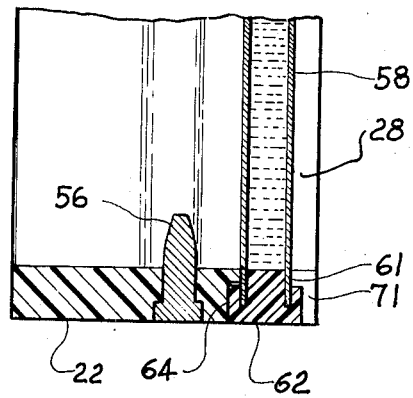
INVENTOR.
Edwin H. Land
BY Brown and Mikulka
and
Robert E. Corb
Attorneys

United States Patent Office 2,833,192
Patented May 6, 1958

2,833,192

SELF-PROCESSING FILM ASSEMBLAGE

Edwin H. Land, Cambridge, Mass., assignor to Polaroid Corporation, Cambridge, Mass., a corporation of Delaware Application October 3, 1955, Serial No. 538,152

15 Claims. (Cl. 95—67)

This invention relates to photographic products and particularly to photographic film units including novel devices for performing a plurality of operations thereon.

Photographic film units have been proposed comprising a photosensitive sheet and a second sheet secured together in superposed relation. The two sheets are preferably opaque to actinic light to prevent premature exposure of the photosensitive sheet and are adapted to be introduced into a camera wherein they are stripped apart and the photosensitive sheet is exposed. The photosensitive sheet includes an area adapted to be exposed and the two sheets are secured together preferably around the margins of this area. The sheets are stripped apart during their introduction into apparatus such as a camera, through a passage provided in the housing of said apparatus, preferably by moving the sheets, commencing at their leading ends, against a member which extends between the sheets for stripping them apart and guiding them along separate paths. This type of film unit construction finds particular application in self-processing film units wherein a processing liquid is distributed in a layer between the photosensitive and second sheets during withdrawal of the film unit from a camera and is effective, for example, to produce a positive photographic print in the second sheet. The processing liquid is supplied in a container, preferably associated with the film unit, and is spread in a layer between the photosensitive and second sheets to form a sandwich by movement of the sheets in superposed position between a pair of pressure-applying members. The processing liquid holds the two sheets in superposed relation, thereby making it possible for the film unit to remain in the presence of light during a predetermined processing period, at the end of which the two sheets may be stripped apart.

A self-processing film unit of the above type is usually employed by introducing it into a camera through a passage in the camera housing and, following the exposure of the photosensitive sheet, withdrawing the film unit from the camera through the same passage. During the introduction of the film unit through a passage into the camera, the film unit must be engaged in such a manner as to prevent the admission of light through the passage into the camera. This and additional operations are usually performed on the film unit by elements of the camera and include the separation of the photosensitive and second sheets during introduction into the camera, the distribution between the sheets of a quantity of processing liquid from a container and, during withdrawal of the film unit from the camera, the superpositioning of the sheets and the spreading of the processing liquid in a thin layer therebetween.

An object of the invention is to provide a photographic film unit comprising a pair of superposed sheets adapted to be introduced into a camera and a device secured around the leading end sections of said sheets adapted to be coupled with said camera, said sheets being movable through said device during introduction into and withdrawal from said camera, said device being so constructed as to prevent the admission of light into said camera and to perform at least one operation on said sheets during movement therethrough.

Other objects of the invention are: to provide, in combination with a film unit comprising two superposed sheets adapted to be introduced into a camera, a device, secured around one end of said film unit so that said sheets are movable therethrough, for retaining said sheets with their leading ends initially separated and for separating said sheets from one another and guiding them along separate paths during introduction of said film unit into a camera; to provide a device of the above type capable of engaging said film unit and being coupled with the housing of a camera so as to prevent the admission of light into said camera during movement of said film unit through said device; to provide a device of the above type for mounting a liquid-carrying container between said sheets adjacent one end thereof for movement with respect to said sheets toward the other end thereof; to provide a device of the above type including means for distributing between said sheets a liquid from a container; and to provide a device of the above type for superposing said sheets, during withdrawal from a camera, and spreading a thin layer of liquid between said sheets to form a sandwich.

A further object of the present invention is to provide a photographic device adapted to be employed in combination with a photographic film unit comprising a photosensitive sheet and another sheet for supplying a quantity of a photographic liquid between said sheets from an elongated container mounted within said device.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a photographic film unit embodying the present invention;

Fig. 2 is a fragmentary perspective view of a camera with which said film unit is adapted to be employed;

Fig. 3 is a sectional view taken along a plane intermediate the ends of a component of the film unit of Fig. 1 and showing said film unit operatively associated with said camera;

Fig. 4 is a sectional view of the film unit of Fig. 3 taken along a line substantially midway between its sides; and Fig. 5 is a sectional view, similar to Fig. 3, of another film unit embodying the present invention.

Generally the film unit of the present invention comprises a photosensitive sheet, a second sheet secured in superposition with the photosensitive sheet and a device preferably secured around said sheets adjacent one end thereof and providing a passage through which said sheets are movable, said device preferably mounting a container of a photographic liquid between the photosensitive and second sheets for movement with respect to the sheets, or at least being so constructed as to permit the introduction of a quantity of photographic liquid between the sheets. The aforementioned device may be adapted to the performance of a number of other operations involved in the employment of the film unit and including, for example, retaining the two sheets with their leading ends initially separated, light-sealing the passage through which the sheets are introduced into a camera, stripping the sheets apart and guiding them along separate paths during introduction into a camera, distributing a processing liquid between the two sheets, and superposing the sheets and spreading the processing liquid in a layer therebetween during withdrawal of the sheets from the camera.

The photosensitive and second sheets and the photographic liquid may be so constituted as to effect a variety of photo-processes and are preferably adapted to production of a photographic print in the second sheet by one of the transfer processes now well known in the art. In one type of film unit, for example, the photosensitive sheet includes an emulsion of silver halide in which a latent image can be attained by differential exposure to actinic light, the second sheet includes an image-receptive layer containing silver precipitating nuclei, and the photographic liquid spread in a layer between the emulsion and image-receptive layer includes a developer, a silver halide solvent and an alkali. In the presence of this layer of liquid a latent image in the photosensitive layer is reduced to silver and a soluble silver complex, formed with the silver of unreduced silver halide, is transferred by imbibition to the image-receptive layer of the second sheet and there is reduced to silver to produce a positive image. Photographic materials generally useful in processes of this type are described in detail in Patents Nos. 2,543,181, issued February 27, 1951, and 2,698,237 and 2,698,245, both issued December 28, 1954, all in the name of Edwin H. Land.

A camera of the type with which the herein disclosed film unit and device are adapted to be employed is described in the copending application of Edwin H. Land, Serial No. 537,982, filed October 3, 1955, and includes a housing having a passage through which the superposed sheets of the film unit may be moved into position for exposure. The camera includes, in addition to means for separating the sheets during movement into the camera, guide means for positioning the two sheets apart from one another so that the photosensitive sheet may be exposed. Following exposure of the photosensitive sheet, the two sheets are withdrawn through the passage from the camera and the sheets are superposed with a layer of processing liquid therebetween.

Reference is now made to the drawings wherein there is illustrated a photographic film unit embodying the present invention and comprising a photosensitive sheet 10 and a second sheet 12, preferably of the same width, secured together in superposed relation. Photosensitive sheet 10 comprises an opaque backing sheet including an area provided with a layer of photosensitive material in which a latent image can be attained by differential exposure to actinic light, and second sheet 12 comprises an opaque sheet having an image-receptive area at least coextensive with the photosensitive area of sheet 10 and superposed therewith, capable of supporting a visible print of a latent image in the photosensitive area. Sheets 10 and 12 are secured together in superposition at least around the margins of the photosensitive and image-receptive areas by a suitable cement or adhesive material, for example a linear polyamide which forms a substantially lighttight bond between the sheets and readily permits their being stripped apart. The photosensitive and image-receptive areas are preferably located adjacent the leading ends of the sheets, i. e., the ends first introduced into a camera, and the trailing ends of the sheets are substantially permanently secured or hinged together so as to properly register the photosensitive and image-receptive areas with one another during withdrawal of the sheets from the camera, and to form a leader which remains outside of the camera and which may be manually grasped for withdrawing the sheets therefrom.

The film unit includes a novel device generally designated at 14 and adapted to perform a number of functions involved in the provision of a film unit and its employment in connection with a camera for producing a photographic print. Device 14, in the form shown, comprises a pair of elongated side walls 16 and 18 and end walls 20 and 22 located in surrounding relation to the leading end sections of sheets 10 and 12. End walls 20 and 22 are spaced apart by a distance substantially equal to the width of sheets 10 and 12 and cooperate with side walls 16 and 18 to form a passage through which the sheets extend. Side walls 16 and 18 include portions 24 having substantially parallel adjacent surfaces defining a relatively narrow throat 26, the sides of which engage the outer surfaces of sheets 10 and 12, making throat 26 substantially lighttight. Side walls 16 and 18 include divergent sections 28 forming a chamber 30 substantially wider than throat 26 and opening in the direction of the leading ends of sheets 10 and 12. Device 14 is adapted to engage the walls of a camera housing adjacent the passage in said housing through which sheets 10 and 12 are introduced so as to form a lighttight juncture with the housing walls and thereby prevent the admission of light into the passage during the introduction and withdrawal of sheets 10 and 12. In a preferred form of film unit, provision is made for coupling device 14 to the camera in a lighttight fashion and for this purpose sections 28 of walls 16 and 18 adjacent the open end of chamber 30 are provided with laterally extending L-shaped or undercut flanges 32 adapted to be engaged in slots in the camera housing.

For purposes of illustration, a portion of a typical camera housing is illustrated and comprises walls 34 and 36 which meet at an oblique angle and a third wall 38 located in a plane substantially perpendicular to walls 34 and 36. The camera housing is provided with an elongated passage or slot 40 located at the juncture of walls 34 and 36 and through which the leading ends of sheets 10 and 12 may be introduced into the camera. To position sheets 10 and 12 apart from one another so that the photosensitive sheet can be exposed, the camera includes a pair of inner walls located adjacent walls 34 and 36 and joined at a V-shaped section 42 having an apex centrally located in passage 40. One of these walls, indicated at 44, cooperates with wall 36 to define a chamber 46 into which second sheet 12 of the film unit is advanced during introduction of the sheets into the camera. As a means for mounting device 14 on the camera housing in closing relation to passage 40, walls 34 and 36 are provided with reentrant sections 48 and 50 on opposite sides of passage 40 adapted to engage undercut flanges 32 of device 14. Reentrant sections 48 and 50 cooperate to define a slot 52, having a generally U-shaped cross section, extending through wall 38 and device 14 is coupled with the camera housing by sliding it into slot 52 in a direction generally perpendicular to wall 38 and to the direction of movement of the sheets into the camera. A means, such as a manually operable locking element 54, is provided on wall 38 for retaining device 14 in position in slot 52.

Heretofore it has been the usual practice to separate the photosensitive and second sheets of a film unit by advancing their leading end sections against the apex of a wedge-shaped member comprising an element of the camera. The wedge-shaped member is located in the passage in the camera housing and is adapted to extend between the sheets and guide them along separate paths during their introduction into the camera. While this means for separating the sheets is satisfactory, some difficulty may be experienced in effecting the initial separation of the leading ends of the sheets due in part to the flexibility of the sheets and the difficulty of lightsealing the passage in the camera and properly locating the leading ends of the sheets relative to the apex of the wedge-shaped member. These difficulties are eliminated by device 14 of the present invention which is not only movable with respect to the sheets and capable of effecting their separation during introduction into the camera, but is effective to provide the film unit with the leading ends of the sheets initially spaced apart. A means is provided located within chamber 30 of device 14 between the leading ends of the sheets for retaining them apart and for separating the sheets as they are moved through chamber 30 and, in the form shown, comprises a pair of tapered pins 56 secured in end walls 20 and 22 and projecting toward one another between the margins of the sheets.

Since sheets 10 and 12 are preferably only secured together along their margins, it is important only that the pins project between the margins in order to separate the sheets as they are advanced against the pins during introduction of the sheets into a camera and this particular construction and arrangement of the pins is the invention of Irving Erlichman, and is claimed in copending application Serial No. 538,048, filed October 3, 1955. By virtue of this arrangement, the two sheets are stripped apart prior to introduction into passage 40 and are advanced into the passage on opposite sides of V-shaped section 42, while device 14 also acts to effectively seal the passage against the admission of light.

The film unit of the present invention preferably includes a quantity of a photographic liquid capable of processing the film unit when spread in a layer between the photosensitive and second sheets by movement of the sheets between a pair of spreading members. The liquid is provided in a container preferably of the type adapted to be withdrawn from the film unit prior to movement of the sheets between a pair of spreading members and, during withdrawal from the film unit, to discharge its liquid contents between the sheets in condition to be spread during subsequent advancement of the sheets between the spreading members. In an alternative embodiment of the invention, the liquid may be discharged between the sheets from a container which is ruptured in situ and not withdrawn from the film unit. The liquid-carrying container, designated at 58, is of the type disclosed in the copending application of Edwin H. Land, Serial No. 522,605, filed July 18, 1955, and is in the form of a tube of a material which is at least impervious to the processing liquid and closed at both ends. The tube may have any convenient cross-sectional shape such as round, oblate, elliptic, etc., and includes one end adapted to open to provide a mouth through which the liquid may be discharged. Container 58 is mounted within chamber 30 between sheets 10 and 12 and extending transversely of the sheets with its ends secured in end walls 20 and 22. Container 58 is filled with a quantity of liquid 60 and is closed at one end 61, for example, by a plug 62 secured in a hole 64 in end wall 22. The other end of container 58 is sealed by flattening the container and pinching and/or securing the walls thereof together and the flattened end section, indicated at 66, projects through a narrow passage 68 in end wall 20 of device 14 where it may be manually grasped for withdrawing container 58 from the film unit in the direction of its elongation. Liquid 60 is preferably quite viscous, having a viscosity ranging, for example, from 100 to 200,000 centipoises at a temperature of 20° C. so that, as container 58 is withdrawn through passage 68 in the direction of end section 66, end section 61 is withdrawn from around plug 62 and successive sections of the container are progressively compressed, liquid 60 being discharged from end section 61 in an elongated mass extending across the sheets substantially from side to side thereof, for example, in the manner more fully described in the last-mentioned application.

The film unit is provided with the leading ends of sheets 10 and 12 extending through chamber 30 on opposite sides of container 58 and preferably engaged between the container and wall sections 28 to aid in retaining the sheets within device 14. The device, in the form shown, is provided with end walls 20 and 22 having slits 70 extending from their edges into, respectively, passage 68 and hole 64. The purpose of slits 70 is to permit wall sections 28 to be spread apart slightly as device 14 is introduced into slot 52 so as to allow free movement of the sheets between wall sections 28 and pins 56 and container 58. To spread sections 28 apart, either or both of reentrant sections 48 and 50 of camera housing walls 34 and 36, and undercut flanges 32 on side walls 16 and 18, are slightly divergent and coact with one another to spread walls 16 and 18 apart during movement of device 14 into operative position in U-shaped slot 52. This arrangement for separating sections 28 is another feature of the invention claimed in the aforementioned Erlichman application. As a means for light-sealing expanded slits 70 and end wall 20, and also passage 68 which may be slightly widened, locking element 54 is adapted to extend across the outer surfaces of end wall 20 and is provided with a shallow recess 72 capable of accommodating flattened end 66 so that portions of element 54 project on opposite sides of passage 68 in engagement with flattened end 66 of container 58. Locking element 54 may, if desired, aid in the discharge of liquid 60 from container 58 and is preferably resiliently biased in the direction of the container so as to close light-seal passage 68 as end 61 of container 58 is withdrawn therefrom. The film unit may be provided without a container of liquid located between the sheets and, in this case, device 14 is formed, for example with an aperture in end wall 20, to permit the introduction of a liquid-carrying container between the sheets and the discharge of the liquid contents of the container between the sheets.

The elongated mass of liquid 60 is spread in a thin layer between the sheets by advancing the sheets in superposition between a pair of parallel spreading members. These members may be biased toward one another so as to apply compressive pressure to the sheets, or they may be substantially fixed with respect to one another to form a narrow pressure-generating slot or passage through which the sheets are moved for generating hydraulic pressure in the liquid between the sheets. This pressure in the liquid causes it to be spread in a thin layer between the sheets as they are moved between the spreading members. In a preferred form of device 14, sections 24 of walls 16 and 18 comprise the fixed spreading members and throat 26 the pressure-generating throat through which the superposed sheets are moved. It is desirable that sections 24 be substantially rigid and for this purpose they may be formed substantially thicker than the other sections of side walls 16 and 18 or they may be provided with reinforcing or stiffening members (not shown) formed of metal or integrally formed therewith. It may be desirable to provide spreading members on the camera adapted to engage the sheets as they are withdrawn from throat 26, or the camera may be provided with members adapted to engage sections 24 so as to rigidly hold said sections or apply pressure through said sections to the sheets. It is to be noted that the tapering of pins 56 proves to be an advantage since this arrangement allows room for the mass of liquid to pass between the pins substantially without contacting the pins and adhering thereto during withdrawal of the sheets from the camera.

The sheets comprising the film unit are adapted to be introduced into the camera by grasping them and pushing them through device 14. The friction on the sheets due to engagement with the walls of throat 26 and the resistance to advancement caused by separation of the sheets may be sufficient to cause the sheets to buckle rather than move through device 14, and accordingly it may be desirable to draw rather than push the sheets into the camera by pulling on one of the sheets. For this purpose sheet 12 is provided with a pull tab 74 and undercut flange 32 of side wall 18 is provided with a slot 76 through which tab 74 projects. Camera housing wall 36 includes an elongated slot 78 communicating with chamber 46 and extending in alignment with slot 76 through reentrant section 50 of housing wall 36. The film unit is provided with tab 74 initially disposed flat against side wall 18 of device 14 so that the device may be inserted into slot 52 into operative position, and following insertion of the device into operative position, the tab may be manually grasped and pulled for drawing sheet 12 into chamber 46 and sheet 10, secured to sheet 12, through device 14 into exposure position in the camera. Sheet 12 is unaffected by light entering slot 78 and, being opaque, serves to prevent the exposure of photosensitive sheet 10.

The herein disclosed film unit is employed by introducing device 14 into U-shaped slot 52 in a camera housing until undercut flanges 32 are coupled in operative position with reentrant sections 48 and 50, locking element 54 being moved into engagement with device 14 to lock it in operative position. Sheets 10 and 12 are then introduced through device 14 into the camera either by pushing the sheets through the device or by pulling the sheets into the camera with the aid of pull tab 74. During movement of the sheets through device 14, they are stripped apart and photosensitive sheet 10 is guided into exposure position within the camera housing. Following exposure of the photosensitive sheet, flattened end 66 of container 58 may be grasped and the container withdrawn from between the sheets through pasage 68 in end wall 20, causing its liquid contents to be distributed in a mass across and between the sheets. As soon as possible thereafter, the trailing ends of the sheets projecting exteriorly of the device are grasped and the sheets withdrawn from the camera through device 14, the sheets being superposed and the processing liquid being spread in a layer therebetween to form a sandwich during movement of the sheets through throat 26. The sheets comprising the sandwich are allowed to remain in superposed relation during a predetermined processing period at the end of which the two sheets may be stripped apart. While device 14 is illustrated in its preferred form comprising a component of a film unit initially secured around the leading end sections of the sheets of the film unit, it may be provided separately and is adapted to be employed with a film unit comprising photosensitive and second sheets, for supplying a quantity of a photographic liquid between the sheets.

Another form of film unit embodying the present invention is illustrated in Fig. 5 and comprises a photosensitive sheet 80, a second sheet 82 secured in superposition with photosensitive sheet 80 and a device 84 secured around the leading end sections of the sheets. Device 84 includes side walls 86 defining a passage 88 within which the leading end sections of sheets 80 and 82 are secured and through which the sheets are movable, and flanges 87 on walls 86 for coupling the device with a camera. Passage 88 includes a narrow section at which portions of walls 86 engage the sheets for preventing the admission of light through the passage and for spreading a liquid in a layer between the sheets; and a substantially wider section within which the leading end sections of the sheets are maintained in separated relation.

Within this wider section of passage 88 is mounted an elongated container 90 extending between the leading end sections of the sheets and transversely thereof. Container 90 carries a photographic liquid of the character described and may be, for example, of the type hereinbefore described adapted to discharge its contents between the sheets during withdrawal from the film unit. Container 90 is mounted in a curved recess or channel formed in a guide member 92 mounted within passage 88 between the leading end sections of the sheets. Guide member 92 is provided for supporting container 90 and/or for maintaining the leading end sections of the sheets apart and for separating the sheets from one another and guiding them along separate paths. Alternatively, device 84 may be provided with only container 90 which then functions to maintain the sheets apart and to separate the sheets from one another; or the device may be provided with only guide member 92 together with means permitting the introduction of a container into passage 88 between the sheets separated by member 92.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic device for use in combination with a photographic film unit including a pair of sheets, said device comprising, in combination, means defining a passage through which the sheets of a film unit are movable, an elongated container carrying a photographic liquid, means for so mounting said container transversely of said passage that the sheets of a film unit can be located within said passage on opposite sides of said container, means permitting the withdrawal of said container, in the direction of its elongation, from said passage transversely of said passage, and means for so compressing said container during withdrawal from said passage as to cause its liquid contents to be distributed from one end of said container in an elongated mass extending substantially from side to side of the sheets of a film unit located within said passage.

2. A photographic device adapted to be employed in combination with a photographic film unit comprising a photosensitive sheet and another sheet for supplying a quantity of a photographic liquid between said sheets, said device comprising, in combination, means defining a passage through which the sheets of a film unit are movable, an elongated container carrying a photographic liquid capable of processing said film unit when spread in a layer between said sheets, means so mounting said container transversely of said passage that the sheets of a film unit can be located within said passage on opposite sides of said container, means permitting the lengthwise withdrawal of said container, in the direction of its elongation, from said passage in a direction transverse of said passage, and means for compressing successive sections of said container from one end during withdrawal from said passage so as to cause its liquid contents to be ejected from its other end in an elongated mass extending substantially from side to side of the sheets of a film unit located within said passage.

3. A photographic device adapted to be employed in combination with a photographic assemblage comprising a photosensitive sheet and a second sheet, said device comprising, in combination, means defining a passage through which the sheets of a photographic assemblage are movable, a quantity of photographic liquid capable of processing said assemblage when distributed in a layer between said sheets, an elongated container in the form of a tube closed at both ends and enclosing said liquid, means for mounting said container transversely of said passage so that said sheets may be located on opposite sides of said container, means permitting the withdrawal of said container, in the direction of its elongation, from said passage transversely of said passage, and means for progressively compressing successive sections of said container during withdrawal from said passage, said container having one end providing a mouth which, when opened as sections succeeding from the other end are sequentially compressed, discharges said liquid from said container in an elongated mass extending substantially from side to side of sheets located within said passage.

4. A photographic film unit of the self-processing type adapted to be introduced into a camera, said film unit comprising, in combination, a photosensitive sheet, a second sheet secured in superposition with said photosensitive sheet, a container carrying a photographic liquid for distribution between said sheets and a device secured around the leading end sections of said sheets defining a passage through which said sheets are movable, said device including means for mounting said container within said passage between said leading end sections of said sheets, said sheets being movable through said passage on opposite sides of said container, said container being removable from between said sheets in a direction normal to the direction of movement of said sheets through said passage, means for causing said photographic liquid to be distributed from said container between said sheets in an elongated mass extending across said sheets during removal of said container from between said sheets, and means for superposing said sheets and spreading said photographic liquid in a layer therebetween during withdrawal of said sheets through said passage from said camera.

5. A photographic film unit of the self-processing type adapted to be introduced into a camera, said film unit comprising, in combination, a photosensitive sheet, a second sheet secured in superposition with said photosensitive sheet, a container carrying a photographic liquid for distribution between said sheets, and a device secured around the leading end sections of said sheets defining a passage through which said sheets are movable, said device including means for mounting said container within said passage between said sheets for movement with respect to said sheets from a location between said leading end sections toward the other end of said sheets, said container extending transversely of said sheets and being removable from between said sheets in a direction normal to the direction of movement of said sheets through said passage, and means for causing said photographic liquid to be discharged from said container between said sheets during withdrawal of said container from between said sheets.

6. A photographic film unit of the self-processing type adapted to be introduced into a camera, said film unit comprising, in combination, a photosensitive sheet, a second sheet secured in superposition with said photosensitive sheet, a container carrying a photographic liquid for distribution between said sheets, and a device secured around the leading end sections of said sheets and defining a passage through which said sheets are movable, said device including means initially retaining said leading end sections within said passage apart from one another, means within said passage for separating said sheet as they are moved through said passage into a camera, and means for mounting said container between said sheets for movement with respect to said sheets from a location between said leading end sections toward the other end of said sheets.

7. A photographic film unit as defined in claim 6 wherein said device includes means for engaging said sheets so as to prevent the admission of light through said passage around said sheets, and means for coupling said device with a camera so as to prevent the admission of light into said camera during the introduction of said sheets through said passage into said camera.

8. In a photographic film unit including two sheets secured in superposition and adapted to be introduced into a camera through a passage in the housing of said camera, in combination, a device secured around the leading end sections of said sheets and movable with respect to said sheets in surrounding relation thereto, said device engaging said sheets in a lighttight manner and being so constructed as to engage a camera for preventing the admission of light into said camera during the introduction of said sheets, said device including means for initially retaining the leading ends of said sheets apart from one another and for separating said sheets from one another during movement of said sheets through said device into said camera, means mounting an elongated container carrying a processing liquid across and between said sheets, and means for causing said processing liquid to be distributed from said container between and across said sheets during withdrawal of said container from between said sheets.

9. A photographic film unit adapted to be introduced into a camera, said film unit comprising, in combination, a photosensitive sheet, a second sheet secured in superposition with said photosensitive sheet and a device surrounding the leading ends of said sheets and defining a passage through which said sheets are movable, said device including means for preventing the admission of light through said passage, means for initially retaining the leading ends of said sheets apart from one another, and means for coupling said device with a camera so as to prevent the admission of light into said camera during the introduction of said sheets through said passage in said device into said camera, and an elongated container carrying a processing liquid, said device including means for mounting said container across and between said sheets, and means for distributing said processing liquid from said container between said sheets in an elongated mass across said sheets during withdrawal of said container from between said sheets.

10. A photographic film unit comprising a pair of sheets secured in superposition and adapted to be introduced into a camera through an opening in the housing of said camera, a device secured around the leading end sections of said sheets and providing a passage open at opposite ends through which said sheets are movable, portions of said device, in the region of at least one end of said passage, engaging said sheets in a lighttight manner and other portions of said device, in the region of the other end of said passage, being so constructed as to be engaged with the housing of a camera in a lighttight manner whereby said passage in said device and the opening in said camera are joined, means mounted within said passage on said device and located between said leading end sections of said sheets for retaining said end sections apart from one another and for separating said sheets from one another in response to introductory movement of said sheets through said passage and into said camera, a container carrying a fluid reagent capable of processing said sheets when distributed therebetween, means for mounting said container within said passage between said sheets in such a way that said sheets are movable through said passage into said camera along opposite sides of said container.

11. The photographic film unit of claim 10 wherein said device includes means for causing the fluid contents of said container to be discharged therefrom between portions of said sheets located within said passage.

12. The photographic film unit of claim 11 wherein said device includes means for superposing said sheets and spreading said fluid contents of said container in a layer between said sheets during withdrawal of said sheets from said camera through said device.

13. The photographic film unit of claim 10 wherein said device includes means for applying compressive pressure to said sheets during withdrawal of said sheets from said camera through said device for effecting the distribution of said fluid reagent in a layer between said sheets.

14. The photographic film unit of claim 10 wherein said device includes means for causing the fluid contents of said container to be ejected from one end of said container across and between said sheets during withdrawal of said container from between said sheets in a direction transversely of said passage.

15. The photographic film unit of claim 10 wherein said sheets are hinged together at their end sections remote from said leading end sections for registering said sheets with one another as said sheets are withdrawn from said camera and superposed with one another.

References Cited in the file of this patent

UNITED STATES PATENTS

| | | |
|---|---|---|
| 2,435,718 | Land | Feb. 10, 1948 |
| 2,447,468 | Reyniers | Aug. 17, 1948 |
| 2,648,265 | Candelo | Aug. 11, 1953 |